2,564,587

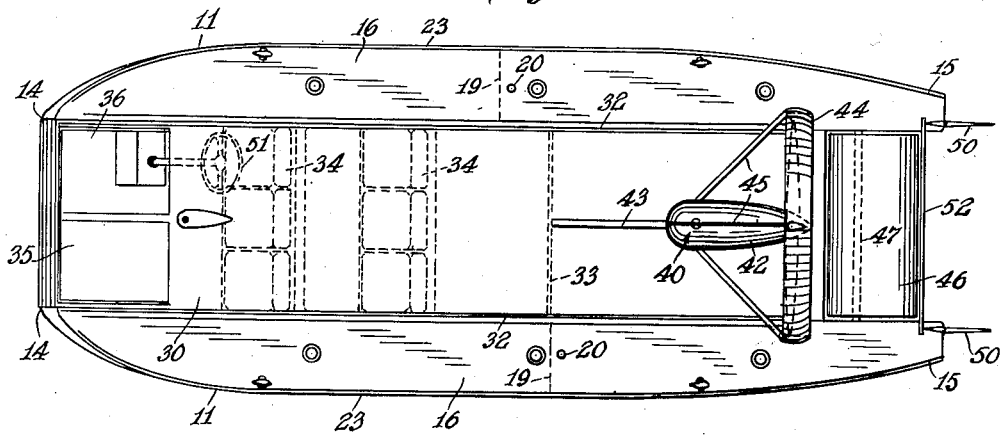
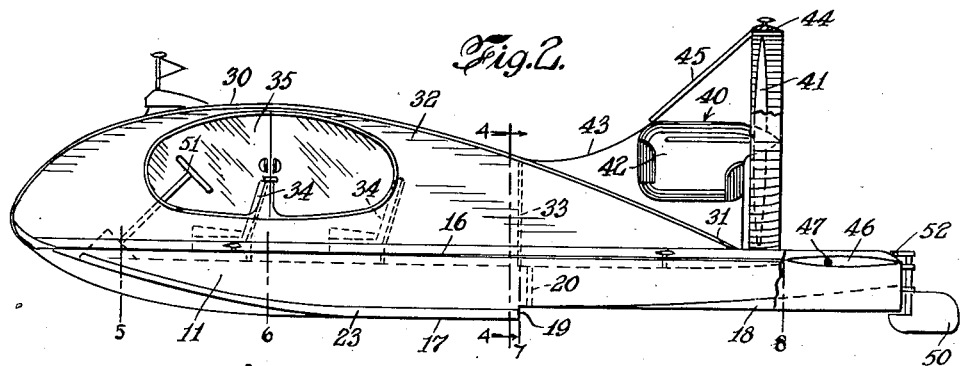
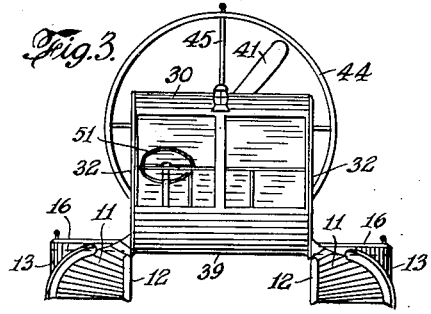
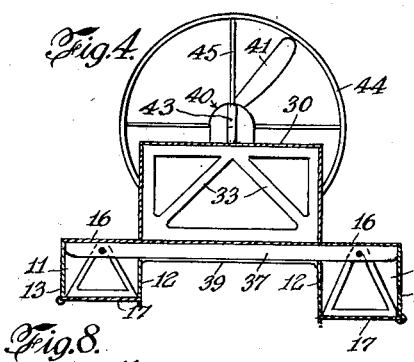
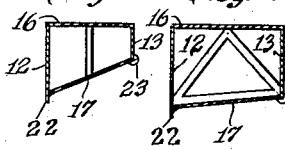
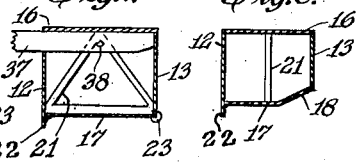
INVENTOR.
HUGO SUNSTEDT Patented Aug. 14, 1951

UNITED STATES PATENT OFFICE 2,564,587

WATERCRAFT

Hugo Sundstedt, New York, N. Y.

Application July 21, 1948, Serial No. 39,940

12 Claims. (Cl. 114—66.5)

The present invention relates to water craft, and particularly to a novel air-propelled water vehicle.

The world speed record in the unlimited class was established in 1939 at Lake Coniston, England, by Sir Malcolm Campbell in his Blue Bird II hydroplane. This record stands at 141.74 miles per hour for a distance of one mile. The American speed record in the unlimited class was established in 1932 at Algonac, Michigan, by Mr. Gar Wood in his Miss America X hydroplane at a speed of 124.915 miles per hour for a distance of one mile. Both of these records were achieved through the expenditure of substantial sums of money and the utilization of engines delivering thousands of horsepower. Since the records still stand, they apparently represent approximately the ultimate speeds possible with the conventional methods of propulsion and hull designs.

It is a purpose of the present invention to provide water craft capable of improving these records with the expenditure of only a small fraction of the horsepower heretofore required, delivered by a single medium-power engine and at a comparatively small cost by utilizing novel principles of hull design and method of propulsion.

The water craft, in accordance with the present invention, is a high speed, high performance, shallow draft hydroplane comprising a pair of spaced floats supporting an airfoil cabin which extends across between the floats and is wholly above the water. The craft is propelled by an aircraft propulsion unit mounted at the rear of the cabin. The floats are reversely symmetrical and are of such configuration that spray is thrown only outwardly so that the space between the floats and beneath the airfoil cabin is free of spray and provides a free passage or tunnel through which air can flow under the cabin deck and out of the stern. The outlet of the air passageway or tunnel is located in the slipstream of the propulsion unit and the entire passageway appears to act as a Venturi tube, or wind tunnel, adding to the speed and smoothness of performance.

At high speed, a considerable amount of lift is provided by the airfoil section of the cabin which corresponds in shape and aerodynamic characteristics to a section of a high camber, high lift, aircraft wing. The aerodynamic lift is increased by the "ground effect" resulting from the relation of the airfoil section to the surface of the water and by the arrangement of the floats in such manner as to confine the flow of air under the airfoil section to a chord-wise direction. By reason of the lift provided by the airfoil cabin, the craft skims lightly over the surface of the water, and water-resistance is reduced to so low a figure that high speeds can be attained with only very moderate power.

The principles and design in accordance with the invention provide comfort, economy of operation and speed never yet attained in the marine industry. The craft is also exceptional for its maneuverability and complete stability under all speed conditions. Since the floats of the craft are longer than a conventional boat of the same displacement and have an insignificant draft when under way, pitching is materially reduced. The vertical keels of the widely set floats knife through the water, providing exceptional directional stability at all speeds. The wide spacing of the floats also greatly reduces rolling. The special design of the floats, as hereinafter described, and the cushioning effect provided by the high lift airfoil section cabin substantially eliminate porpoising and pounding. The craft throws very little spray while getting under way and virtually none at high speeds.

The maneuverability of the water craft in accordance with the present invention is unexcelled at any speed. At high speed, the exceptional inherent stability of the craft permits rapid maneuvers to be executed without danger of capsizing or losing headway. On the straightaway and in turns, the craft remains stable longitudinally, laterally and directionally.

The initial cost of the water craft in accordance with the invention is smaller than that of a conventional boat of similar capacity and comfort and approaching it in performance. The operating cost of the craft is the lowest in the power boat field and is especially low at speeds above 35 to 40 miles per hour. Because of the unique simplicity of its construction, the maintenance cost of the craft is insignificant.

The water craft in accordance with the present invention represents a radically new departure in the boat-building art.

The remarkable characteristics and performance of the craft have been fully confirmed by water basin tests of scale models and by a full-scale prototype which has been thoroughly tested under various sea conditions.

The invention is applicable not only to racing craft, but to a wide variety of vessels ranging from sports two-seaters to large rapid transit ferries accommodating several hundred passengers. In the accompanying drawings, there is shown, by way of example, a six-place cruiser embodying the invention.

In the drawings:

Fig. 1 is a plan view of the craft.

Fig. 2 is a side elevation.

Fig. 3 is a front view.

Fig. 4 is a cross-section taken approximately on the line 4—4 in Fig. 2.

Figs. 5, 6, 7 and 8 are fragmentary cross-sections through one of the floats taken respectively at the section lines designated 5, 6, 7 and 8 in Fig. 2.

As illustrated in the drawings, the water craft in accordance with the present invention has a split hull comprising a pair of spaced, reversely symmetrical hull portions or floats, a cabin of airfoil contour in vertical longitudinal section disposed between the separated portions of the hull and supported by them with the bottom of the cabin above the normal water line so as to provide for free passage of air beneath the cabin, and an airplane type propulsion unit mounted behind the cabin.

The split hull comprises a pair of spaced parallel floats 11 extending longitudinally at the opposite sides of the craft. The two floats are reversely symmetrical and are similar in configuration to the results that would be obtained by splitting a conventional boat hull into two halves by a vertical plane passing through the longitudinal axis and then separating the two halves while keeping them parallel. The inner wall 12 of each float is substantially straight and vertical. The outer wall 13 is also approximately vertical and preferably curves inwardly at the forward end to provide a sharp prow 14. The rearward portion of the outer wall may also curve or angle inwardly to reduce the width of the float at its stern, as indicated at 15. The top wall 16 of each float is preferably flat to conform with the clean lines of the craft and provide a flat deck surface extending fore and aft on each side of the cabin. The bottom wall 17 of each float curves upwardly at its forward end to provide a sharp clean cut prow. The forward portion of the bottom wall also slopes upwardly and outwardly in transverse cross-section, as shown in Figs. 5 and 6. Proceeding rearwardly from the prow of the float, the slope of the bottom wall progressively decreases. In the mid-portion of the float, the bottom wall is substantially flat, as shown in Fig. 7. Proceeding back from the substantially rectangular cross-section of the mid-part of the float, the lower outboard corner is bevelled off a progressively increasing amount, as indicated at 18 in Figs. 2 and 8. At a point a short distance to the rear of the center of gravity of the craft, the bottom wall of each float is provided with a step 19. Preferably, the step of one float is ahead of the step of the other float, as clearly shown in Fig. 1. This staggering of the two steps has been found to reduce and substantially eliminate porpoising at all speeds. Just to the rear of each step, there is provided a breather tube 20 extending from the bottom of the float to a point above the water-line. In some instances it has been found desirable to provide another step a short distance in front of the stern.

The floats are of strong, yet light weight, construction comprising, for example, a skin of metal or plywood over a truss-type frame. Portions of the frame are shown at 21 in Figs. 5 to 8. At the lower inboard corner of each float, there is a downwardly projecting keel 22 which is preferably formed of a heavier metal member, for example, a T iron. At the lower outboard corner of each float, there is provided a downwardly and outwardly projecting rail or bead 23. The keel 22 contributes to the directional stability of the craft and also helps prevent any spray or wash being thrown inwardly by the floats to clog the air passage beneath the cabin. The outer rail 23 also contributes to stability and, with the keel 22, helps reinforce the float and protects it from damage.

As the floats employ only planes and simple curves without any compound curves or complex configurations, they can be economically and sturdily constructed. They are preferably divided into a large number of water-tight compartments which may be filled with buoyant material such as foam glass or foam rubber, making the craft unsinkable.

The cabin 30 is of airfoil contour in vertical longitudinal section corresponding in shape to a section of a high camber, high lift airplane wing. The bottom wall, or deck, of the cabin is substantially flat and lies approximately in the same plane as the deck portions formed by the top surfaces of the floats 11. The nose portion is curved, corresponding to the leading edge of a high lift wing. The upper surface is also curved like that of a high lift wing, the radius of curvature progressively increasing towards the rear of the cabin. The upper camber is greater than the lower camber of the airfoil section and the total camber is quite high, the depth of the section being preferably not less than $\frac{1}{10}$ of the chord. In the embodiment shown, the depth of the airfoil section is approximately one-fifth of the chord. The airfoil section, hence, has exceptionally high lift characteristics, even at relatively low speeds. The upper and lower walls of the cabin converge in a sharp trailing edge 31. The side walls 32 of the cabin are shown in Fig. 3 as being substantially vertical. However, if desired, they may be somewhat curved and the corners may be rounded to give a more pleasing appearance. The width of the cabin is preferably equal to the spacing between the floats so that the side walls of the cabin and the inboard walls of the floats are approximately in the same plane. The cabin is provided with one or more transverse bulk heads 33 which take transverse and torsional loads and may also be utilized to divide the cabin into compartments. The seats 34 also preferably extend the full width of the cabin and give added structural strength. Scenic sliding windows 35 of safety glass afford a panoramic view ahead and to the sides while a Vita-Glass roof window 36 provides for full vision forward and above. The sliding doors or windows 35 also provide access to the cabin from the broad decks of the floats on either side.

The deck of the cabin is supported by a plurality of transverse spars 37 which extend out beyond the sides of the cabin a distance approximately equal to the width of the floats. The projecting ends of the spars are received through openings provided for that purpose in the inner wall of the floats just below the deck, as illustrated in Fig. 7. At each of these openings, the inside of the float is preferably provided with a transverse boxlike structure to receive the end of the spar while at the same time sealing the interior of the float against entry of any water through the opening. The end of each spar which projects into the float is removably secured to the structure of the float, for example by a single bolt 38 (Fig. 7).

Suitable handholds are provided in the decks of the floats, to afford access to these bolts.

This construction makes the removal of the floats a quick and easy operation. If a float should become damaged, it can be readily removed and sent away for repairs or a new float substituted. Moreover, the floats can be removed and replaced by runners, thereby converting the craft into an air propelled sled. In order that the cabin may have a perfectly smooth undersurface, the deck of the cabin is secured to the bottom of the spars 37, or, alternatively, the spars extend under the deck of the cabin and are covered by a bottom skin 39.

The cabin provides unexcelled visibility and generous head and leg room as well as large and easily accessible storage space for luggage, stores, accessories and equipment. The cabin rides high above the waterline and is a self-contained structure independently watertight up to window-sill level and fully enclosed and spray-proof.

An important feature of the present invention is that the airfoil cabin is supported by the spaced floats in such manner that the bottom of the cabin is well above the waterline, particularly when the craft is under way. This leaves a free passage for air in a chord-wise direction beneath the airfoil. Moreover, the configuration of the floats is such that no appreciable wash or spray is thrown to the inboard side to clog or block the air tunnel beneath the cabin. There is hence no interference with the aerodynamic lift provided by the high camber airfoil section. In fact, the amount of lift is increased by the "ground effect" and by the action of the floats in preventing lateral or spanwise air "wash." In this respect, the floats appear to act in somewhat the same manner as discs at the tips of airplane wings. By reason of the aerodynamic lift provided by the fuselage, or cabin, the craft skims lightly over the water and can be driven at high speed with only a moderate amount of power.

The craft is propelled along the surface of the water by an aircraft-type propulsion unit 40 which is mounted at the rear of the cabin. In the drawings, the propulsion unit is shown as an airscrew 41 driven by an aircraft engine 42 which is mounted in a vertical fin 43 extending rearwardly from the cabin. For quiet and efficient operation, the propeller preferably has three or more blades, with paddle tips. An adjustable and reversible pitch propeller makes it possible to operate efficiently at all speeds and provides instant braking and reversing action.

The propeller is encircled by a guard ring 44 held in position by suitable struts 45. The ring 44 is of airfoil cross-section, as indicated in Fig. 2, to provide greater efficiency of operation and maximum control, as pointed out below.

The propulsion unit is mounted approximately at the trailing edge of the airfoil-shaped cabin and is above the deck extending across between the two floats, so that it is fully protected from the water. The position in which the propeller is mounted causes high velocity air flow over the upper airfoil surface, thereby increasing the lift provided by the airfoil section. The position in which the engine 42 is mounted facilitates adequate cooling of the engine. The vertical fin 43 not only provides a support for the engine but also acts as a stabilizer.

The floats 11 extend rearwardly beyond the trailing edge 31 of the cabin. An aerodynamically balanced stabilizing surface, or elevator, 46 extends across between the floats behind the trailing edge 31 and is swingable about a horizontal axis 47. The elevator 46 is preferably of airfoil section and is located with its leading edge just behind the trailing edge 31 of the cabin or behind a deck portion forming an extension of this trailing edge. The airscrew 41 is ahead of the elevator so that the elevator is located in the slipstream of the airscrew as directed by the airfoil-shaped guard ring 44. It will be seen that if the leading edge of the elevator 46 is swung upwardly, it will catch a portion of the slipstream of the airscrew and direct it downwardly through the air passage which is formed by the floats and the elevator and constitutes an extension of the air passage between the floats and underneath the cabin. By tilting the elevator with the forward edge inclined downwardly, air will be drawn out of the passage by an induction effect and a downward force will be exerted on the elevator. The elevator is thus operable to control the trim of the craft and its operation, both by varying the angle of attack of the airfoil section cabin and by varying the flow of air through the passageway beneath the cabin. By adjusting the elevator 46 to make the stern of the craft ride higher or lower, the cross-sectional area of the rear vent of the passageway can be increased or decreased. The elevator also acts as explained above to increase or decrease the induction effect of the propeller slipstream on the air flow through the passageway between the floats. The elevator is adjustable by the pilot through suitable control connections (not shown).

At the stern of each float there is provided a balanced rudder 50. Both rudders are controlled by a steering wheel 51 in the cabin acting through suitable control connections 52. The twin rudders, one on either side of the clear channel between the two floats, act on relatively undisturbed water and provide excellent directional control.

While the propulsion unit is shown in the form of an airscrew driven by an engine, other forms of propulsion units, such, for example, as jet engines or rockets, may be used instead of or in addition to the airscrews. The term propeller as used in the claims is intended to encompass such alternative propulsion units. Moreover, it will be understood that any desired number of propulsion units may be used.

The present invention thus provides a novel type of water craft which is capable of attaining high speed with moderate power and is exceptionally maneuverable and unusually stable statically and dynamically. Moreover, unlike conventional high speed boats, it is unexpectedly economical in original cost, maintenance and operation.

I claim:

1. Water craft comprising a pair of spaced, reversely symmetrical removable floats, said floats being spaced at a predetermined fixed distance, an enclosed cabin disposed between the floats and supported by the floats with the bottom of the cabin above the normal waterline, the cabin being of airfoil contour in vertical longitudinal section, a propeller rotatably mounted behind said cabin and means for driving the propeller.

2. In water craft, the combination of a split hull comprising a pair of spaced, reversely symmetrical hull portions each having a straight, vertical inner wall and a contoured outer wall, an enclosed cabin of airfoil contour in vertical longitudinal section disposed between the hull portions and supported by the hull above the normal waterline, the forward end of said cabin and the forward ends of said hull portions being substantially aligned, a propeller behind the cabin and means for driving the propeller.

3. In water craft, the combination of a split hull comprising a pair of spaced, reversely symmetrical hollow hull portions each having a straight vertical inner wall, a substantially vertical, outwardly curved outer wall, a substantially flat upper wall and a bottom wall having an upwardly and outwardly sloping forward portion merging smoothly into a substantially flat mid-portion, a cabin of airfoil contour in vertical longitudinal section disposed between and supported by the hull with the bottom of the cabin above the normal waterline, and a motor driven propeller for propelling said water craft over the water.

4. In water craft, the combination of a split hull comprising a pair of spaced, reversely symmetrical hollow hull portions each having a straight vertical inner wall, a bottom wall having a substantially flat mid-portion and a substantially flat top wall, a cabin of airfoil contour in vertical longitudinal section disposed between and supported by the hull portions, the cabin having vertically extending side walls approximately in line with the inner walls of the hull portions and a bottom wall at approximately the level of the tops of the hull portions and a motor driven propeller behind the cabin.

5. Water craft comprising a pair of spaced, reversely symmetrical floats, a cabin in the form of a deep wing section of airfoil contour disposed between and supported by the floats with the bottom of the wing section above the normal waterline throughout its length to provide an open air tunnel of venturi-like form between the water, the inner sides of the floats and the bottom of the wing section, an elevator extending across between the rear end portions of the floats to the rear of the trailing edge of the wing section and forming with said floats a continuation of the air tunnel, the elevator being swingable about a horizontal pivotal axis disposed behind and parallel to the leading edge of the elevator and a motor driven propeller mounted above said tunnel and ahead of the elevator.

6. Water craft comprising a pair of spaced, reversely symmetrical floats, a cabin in the form of a deep wing section of airfoil contour disposed between and supported by the floats with the bottom of the wing section above the normal waterline throughout its length to provide an open air tunnel of venturi-like form between the water, the inner sides of the floats and the bottom of the wing section, a motor driven pusher propeller mounted at the rear of the cabin, an elevator pivotally mounted in the slipstream of the propeller and swingable about a horizontal axis lying substantially in the plane of the bottom of the cabin and an underwater, balanced rudder at the stern end of each of the floats.

7. Water craft comprising a pair of spaced, reversely symmetrical floats each having a straight vertical inner wall, a substantially vertical outer wall, a flat top wall and a bottom wall having an upwardly and outwardly sloping forward portion merging into a substantially flat mid-portion, a step in the flat mid-portion of each float, the step in one float being ahead of the step in the other float, a cabin of airfoil contour in vertical longitudinal section disposed between and supported by the hull portions with the bottom of the cabin above the normal waterline to form an open ended air tunnel between the water, the floats and the bottom of the cabin and a motor driven propeller mounted at the rear of the cabin.

8. Water craft comprising a pair of spaced, reversely symmetrical floats each having a straight vertical inner wall, a substantially vertical outer wall, a flat top wall and a bottom wall having an upwardly and outwardly sloping forward portion merging into a substantially flat mid-portion, each float having a downwardly and outwardly projecting rail at the junction of the outer and bottom walls and a downwardly projecting keel at the junction of the inner and bottom walls, a cabin of airfoil contour in vertical longitudinal section disposed between and supported by the hull portions with the bottom of the cabin above the normal waterline and a motor driven propeller mounted at the rear of the cabin.

9. Water craft comprising an enclosed cabin of airfoil shape in vertical longitudinal section with a substantially flat bottom wall and vertical side walls, a plurality of transverse spars supporting the bottom wall of the cabin and extending beyond the side walls, a pair of reversely symmetrical floats having straight inner walls and substantially flat top walls, the inner walls having spaced openings adjacent the top walls to receive the projecting ends of the spars, means for removably securing the floats to the spars in predetermined spaced relationship to one another, the cabin being supported by the floats with the bottom of the cabin above the normal waterline, a propeller rotatably mounted behind said cabin and means for driving the propeller.

10. Water surface craft comprising a pair of spaced, parallel, reversely symmetrical floats, an enclosed cabin disposed between and supported by the floats with the bottom of the cabin above the normal waterline, said cabin being of a length approximately equal to the length of the floats and having the shape in vertical longitudinal section of a high camber airplane wing with vertical side wall portions extending upwardly from the tops of said spaced floats and a motor-driven propeller behind the cabin.

11. Water surface craft comprising a pair of spaced, parallel, reversely symmetrical floats, an enclosed cabin of airfoil contour in vertical longitudinal section disposed between the floats with the bottom of the cabin above the normal water line whereby the cabin acts as a wing section to provide substantial lift in high speed forward movement and a motor-driven propeller disposed approximately at the trailing edge of the airfoil section cabin and above the chord line of said airfoil section.

12. Water surface craft comprising a pair of spaced, parallel, reversely symmetrical floats, a cabin disposed between and supported by the floats with the bottom of the cabin above the normal waterline throughout its length to provide an open air tunnel between the water, the inner sides of the floats and the bottom of the tunnel, a motor-driven propeller mounted at the rear of the cabin but above and in front of the rear end of said tunnel and a ring of airfoil cross-section encircling the tips of the propeller and directing the propeller slipstream back over the rear end of said tunnel, said cabin being of airfoil contour in vertical longitudinal section whereby the cabin acts as a wing section to provide substantial lift in high speed forward movement.

HUGO SUNDSTEDT.

(References on following page)

REFERENCES CITED

The following references are of record in the file of this patent:

UNITED STATES PATENTS

| Number | Name | Date |
|---|---|---|
| 1,025,399 | Holmstrom | May 7, 1912 |
| 1,327,543 | Funk | Jan. 6, 1920 |
| 1,686,264 | Brownback | Oct. 2, 1928 |
| 1,748,252 | Sundstedt | Feb. 25, 1930 |
| 1,802,861 | Zwinkel | Apr. 28, 1931 |
| 1,928,317 | Rippen | Sept. 26, 1933 |
| 2,271,065 | Dornier | Jan. 27, 1942 |
| 2,320,574 | Dornier | June 1, 1943 |
| 2,361,556 | Makaroff | Oct. 31, 1944 |

FOREIGN PATENTS

| Number | Country | Date |
|---|---|---|
| 19,007 | Great Britain | of 1898 |
| 135,239 | Australia | Nov. 10, 1933 |